(12) United States Patent
Wohl et al.

(10) Patent No.: US 6,655,582 B2
(45) Date of Patent: Dec. 2, 2003

(54) SYSTEM AND METHOD FOR IDENTIFYING OBJECTS USING SINGLE CONNECTION LINE

(75) Inventors: Michael A. Wohl, Rogersville, TN (US); Robert W. Boyd, Eidson, TN (US)

(73) Assignee: Wherenet Corp, Santa Clara, CA (US)

( * ) Notice: Subject to any disclaimer, the term of this patent is extended or adjusted under 35 U.S.C. 154(b) by 136 days.

(21) Appl. No.: 10/038,532

(22) Filed: Jan. 2, 2002

(65) Prior Publication Data

US 2002/0104879 A1 Aug. 8, 2002

Related U.S. Application Data

(60) Provisional application No. 60/259,343, filed on Jan. 2, 2001.

(51) Int. Cl.$^7$ ................................................. G06K 5/00
(52) U.S. Cl. ......................................... 235/380; 235/383
(58) Field of Search ................................. 235/380, 375, 235/492, 383, 385, 382, 382.5; 340/825.36, 825.49

(56) References Cited

U.S. PATENT DOCUMENTS

| | | | | |
|---|---|---|---|---|
| 6,040,774 A | * | 3/2000 | Schepps | 340/572.1 |
| 6,121,926 A | * | 9/2000 | Belcher et al. | 342/450 |
| 6,317,082 B1 | * | 11/2001 | Bacon et al. | 342/465 |
| 6,380,894 B1 | * | 4/2002 | Boyd et al. | 342/450 |
| 2002/0104879 A1 | * | 8/2002 | Wohl et al. | 235/380 |

* cited by examiner

*Primary Examiner*—Thien M. Le
(74) *Attorney, Agent, or Firm*—Allen, Dyer, Doppelt, Milbrath & Gilchrist, P.A.

(57) ABSTRACT

A system and method for identifying objects within a monitored environment includes a plurality of tag signal readers contained within the monitored environment and serially connected along a single connection line as a coaxial cable for receiving tag signals from at least one tag contained within the monitored environment. The tagged signals received by tag signal readers are timed and associated with a particular tag signal reader, such as by the use of multiplexing techniques. A location processor is connected to the single connection line and determines which tag signals are first-to-arrive signals and conduct differentiation of the first-to-arrive signals to locate a tag.

22 Claims, 4 Drawing Sheets

SYSTEM AND METHOD FOR IDENTIFYING OBJECTS USING SINGLE CONNECTION LINE

RELATED APPLICATION

This application is based upon prior filed copending provisional application Ser. No. 60/259,343, filed Jan. 2, 2001.

FIELD OF THE INVENTION

This invention relates to the field of object location and tracking systems for asset management systems, and more particularly, this invention relates to object tracking and location systems using a plurality of tag signal readers contained within a monitored environment and using differentiation of first-to-arrive signals to locate a tag applied to an object.

BACKGROUND OF THE INVENTION

In U.S. Pat. Nos. 5,920,287; 5,995,046; 6,121,926; and 6,127,976, the disclosures which are hereby incorporated by reference in their entirety, a real time location system is disclosed using a plurality of tag emission (signal) readers that are disbursed throughout a monitored environment, such as a manufacturing environment, and are operative with a location processor to determine which tag signals are first-to-arrive signals and conduct differentiation of the first-to-arrive signals to locate a tag located within the monitored environment. In this system architecture arrangement, the tag signal readers are connected in a "hub and spoke" arrangement. For example, a tag signal reader could include two antenna for diversity that receive power from the location processor and connect in the "hub and spoke" arrangement to a location processor, allowing eight tag signal readers to connect to one location processor. In some environments, where the cable line length spacing among the different tag signal readers could be many hundreds of feet, the cabling costs could exceed the hardware costs.

In a multistory building or other building, such a "hub and spoke" arrangement may not be necessary, and an alternative architecture could be preferable that would have lower costs, as long as it provided the ability for any connected location processor to determine which tag signals are first-to-arrive signals and conduct differentiation of first-to-arrive signals to locate a tag connected to the object to be located.

SUMMARY OF THE INVENTION

The present invention provides a location sensor array architecture using a single coaxial line for removing delay, and in one aspect, time and multiplexing techniques, which significant cost savings for certain applications, such as multistory or small buildings. Multiple location antennae correspond to tag signal readers and are connected by a common connection cable as a coaxial cable and processed by a location processor as a preferred one (dual channel) processor. Tag signals received by any antenna of a tag signal reader are timed and associated with that particular receiving antenna and tag signal reader, such as using timed, multiplexing techniques.

The system of the present invention identifies objects within a monitored environment and includes a plurality of tag signal readers contained within the monitored environment and serially connected along a single connection line for receiving tag signals from at least one tag contained within the monitored environment. The tag signals received by tag signal readers are timed and associated with a particular tag signal reader. A location processor is connected to the single connection line for determining which tag signals are first-to-arrive signals and conducting differentiation of the first-to-arrive signals to locate a tag. Although different types of location processors could be used, typically a single processor could be sufficient.

In yet another aspect of the present invention, the single, connection line comprises a single, coaxial cable. The tag signals are pseudorandom spread spectrum radio frequency signals. The location processor comprises a matched filter correlator having a plurality of matched filter banks containing parallel correlators. The tag comprises a mobile device.

In yet another aspect of the present invention, the system identifies tagged objects located within a multistory building. A plurality of vertically separated tag signal readers are positioned respectively at a corner on each floor of the multistory building and serially connected along a single connection line as a coaxial cable extending vertically and connecting tag signal readers at the corners. Tag signals are received from at least one tag contained within the multistory building. The tag signal is received by tag signal readers and associated with a particular tag signal reader at a corner. The location processor is connected to the signal connection line and determines which tag signals are first-to-arrive signals and conducts differentiation of the first-to-arrive signals to locate a tag within the multistory building.

BRIEF DESCRIPTION OF THE DRAWINGS

Other objects, features and advantages of the present invention will become apparent from the detailed description of the invention which follows, when considered in light of the accompanying drawings in which.

DETAILED DESCRIPTION OF THE PREFERRED EMBODIMENTS

The present invention will now be described more fully hereinafter with reference to the accompanying drawings, in which preferred embodiments of the invention are shown. This invention may, however, be embodied in many different forms and should not be construed as limited to the embodiments set forth herein. Rather, these embodiments are provided so that this disclosure will be thorough and complete, and will fully convey the scope of the invention to those skilled in the art. Like numbers refer to like elements throughout.

The present invention advantageously overcomes prior art location and tracking architectures where a receiving point is deployed as a tag signal reader and directly wired to a location processor in a "hub and spoke" arrangement. In some situations, this type of arrangement causes the cabling costs sometimes to exceed the hardware costs. By using a single, coaxial cable connection in a "daisy-chain" arrangement, where tag signal readers are "daisy-chained" together, the number of connection paths is reduced to two by the daisy chaining, and thus, it is possible to determine which tag signal reader receives a specific tag signal.

Figure 1:
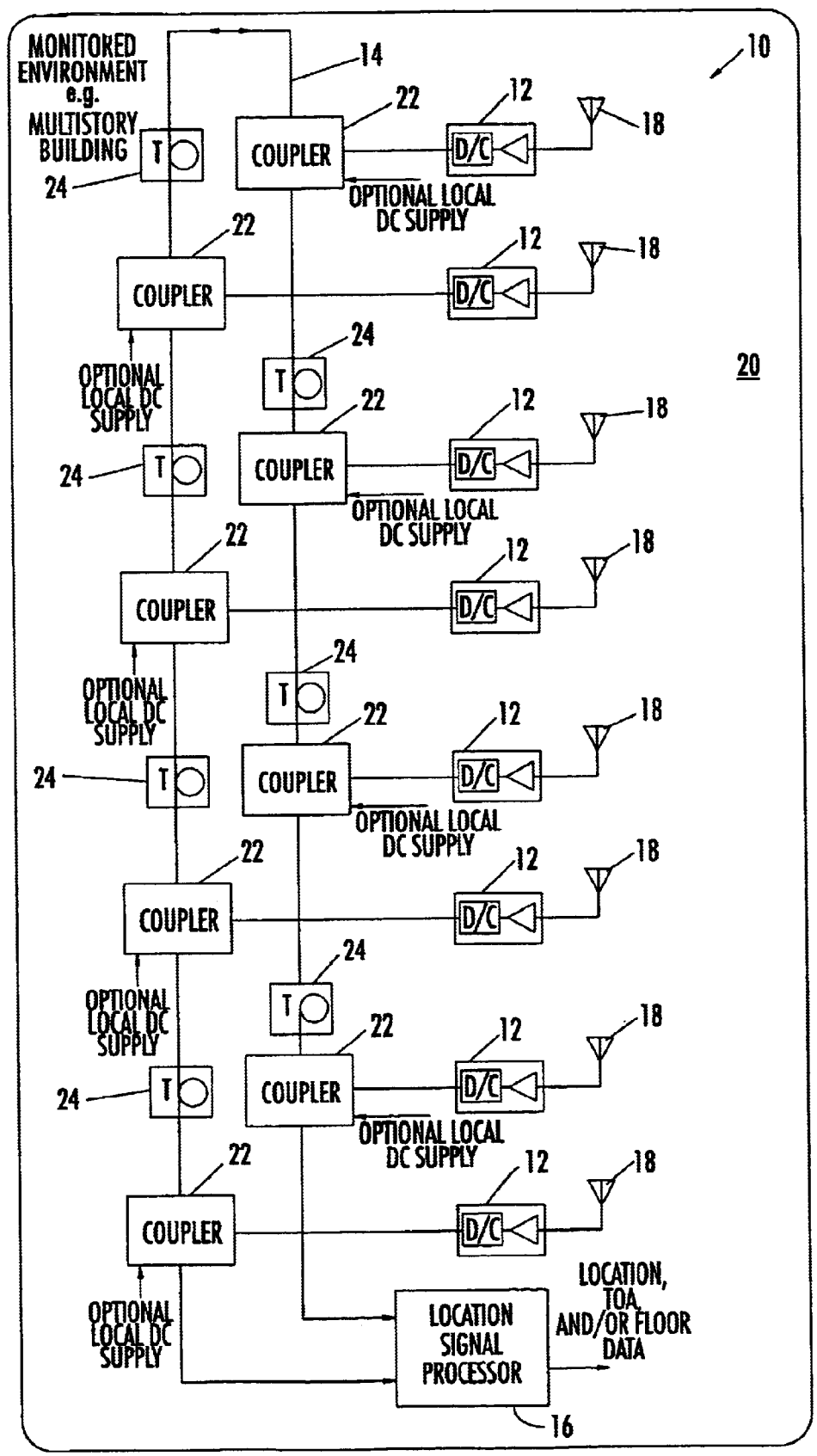
FIG. 1 is a block diagram of the system of the present invention showing a single connection line for connecting tag signal readers to the location processor.

FIG. 1 shows a basic block diagram of a location sensor array (LSA) architecture of the system 10 of the present invention, showing a plurality of tag signal readers 12 that are "daisy-chained" together using a single coaxial cable 14. This architecture provides significant cost savings for certain applications, such as multistory or small buildings. It allows multiple location antenna as part of the tag signal reader to be connected by a common coaxial cable and signals to be processed by a location processor 16 as a single (dual channel) processor. Tag signals can be received at an antenna 18 of a tag signal reader 12 and timed and associated with a particular tag signal reader and its antenna by timing and multiplexing techniques known to those skilled in the art.

In some prior art architectures, there have been some attempts to reduce the number of cables and/or processing channels required for a location and tracking infrastructure. These prior art attempts have not proven feasible because the systems could not provide unambiguous association of a tag reception with the receiving antenna without secondary modulation specific to each reader, i.e., single-ended delay line summing. Also, there was an unacceptable reduction in the probability of tag reception and/or location, for example, with time multiplexed readers. Also, these location infrastructures required expensive hardware not presently available, such as for frequency multiplexing.

In the present invention, the simultaneous processing of tag receptions from multiple antennas at different locations allows the system architecture, as illustrated in FIG. 1, to obtain a significant cost reduction for some applications, such as certain multistory buildings and other locations and monitored environments. A unique (double-ended) sensor (antenna) array as illustrated permits outputs for multiple sensors or readers 12 to be connected to a single processing unit 16. The present invention allows unambiguous resolution of signal sources through differential sensing without requiring additional signals or references from the sensors or environment. There is a distinction between multiple receptions of one signal at one sensor with multipath and single receptions and multiple sensors. There is also a potential for coherent multichannel processing that lends itself to future advancements in signal processing functions and features.

The system of FIG. 1 shows a monitored environment 20 having a plurality of tag signal readers 12 contained within the monitored environment and serially connected along the single connection line as a coaxial cable 14 using couplers 22 that are powered by an optional local DC power supply. The antenna 18 could correspond to a dual diversity antenna and connects to an amplifier and digital and analog conversion circuitry of the tag signal reader as further described in the incorporated by reference patents as identified above. As illustrated, timing, amplifier and multiplexing circuits 24 are connected with the single line 14. The location processor 16 is connected to a single connection line as a coaxial cable 14 with the appropriate circuitry for determining which tag signals are first-to-arrive signals and conducting differentiation of the first-to-arrive signal to locate a tag. The tag signals are pseudorandom spread spectrum radio frequency signals and the location processor 16 includes a matched filter correlator having a plurality of matched filter banks containing parallel correlators as will be explained in further detail below. Naturally, the tag could be any type of mobile device.

Although the illustrated system shown in FIG. 1 is only one type of system architecture, it could be implemented using greater than 200 foot cable length between tag signal readers using location equipment, such as manufactured and sold by WHERENET USA of Santa Clara, Calif. It is also possible to use signal processing cards as part of computers that could be designed specifically for this type of architecture. The design would allow for cross correlation between sensor outputs providing better first path detection and hardware sensor, e.g., floor determination, but open the door to inexpensive small building applications where a single chain could be used to locate the small structures.

Figure 2:
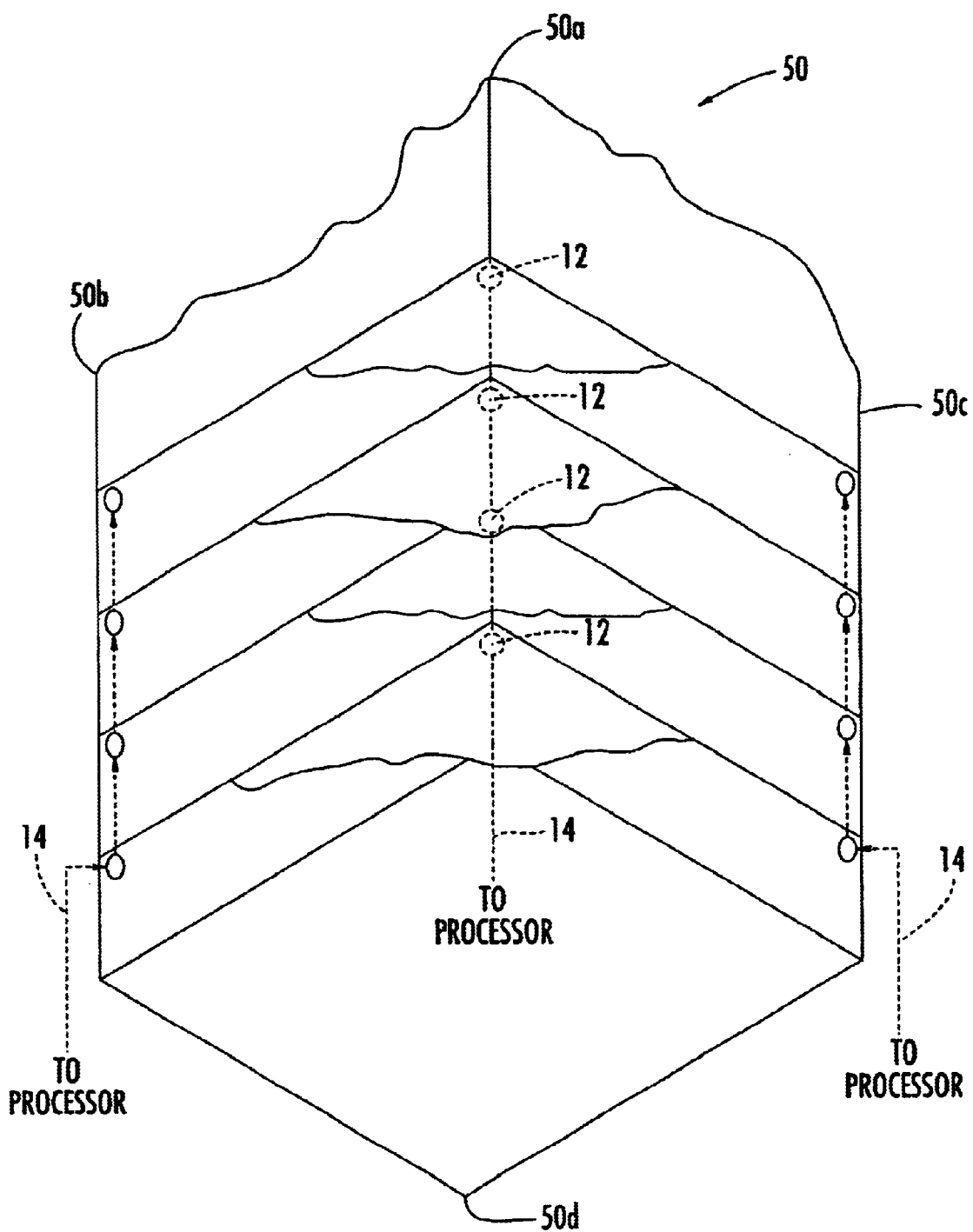
FIG. 2 is a fragmentary, partial isometric view of a multistory building showing vertically connected tag signal readers.

FIG. 2 illustrates a typical multistory building 30 with four corners 50a–d where one tag signal reader 12 is placed per corner at each floor. Therefore, a ten-story building might require only four location processors 16, or processing cards, for a total of one "reader" or tag signal reader per corner per floor. With the sensors or readers separated vertically, this structure places no restriction on how the tag signal readers and sensors could be placed.

Figure 3:
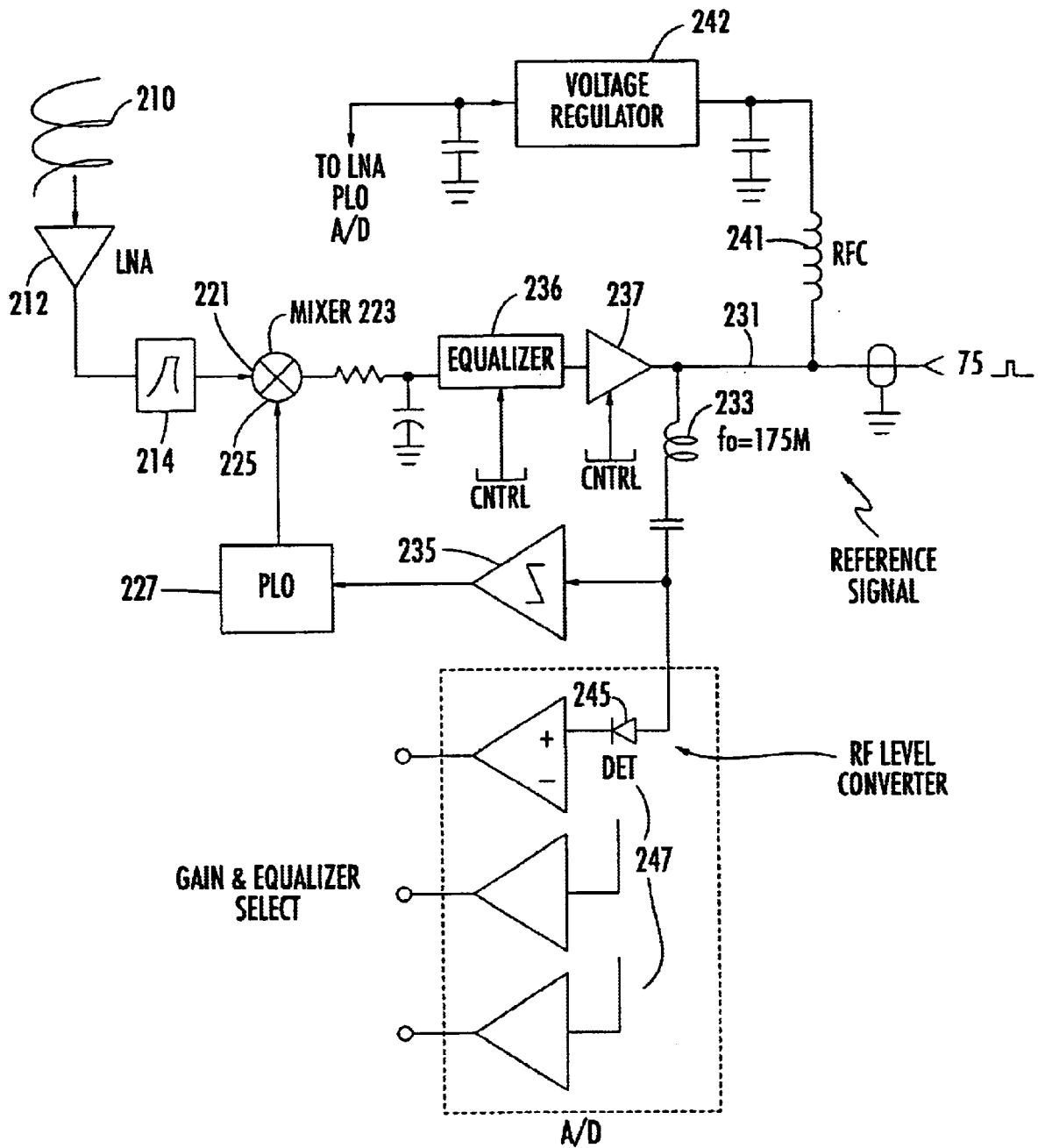
FIGS. 3 and 4 represent high level block diagrams of representative circuit architectures that can be used as part of the location processor for determining first-to-arrive signals and conducting differentiation of first-to-arrive signals to locate a tag.
Figure 4:
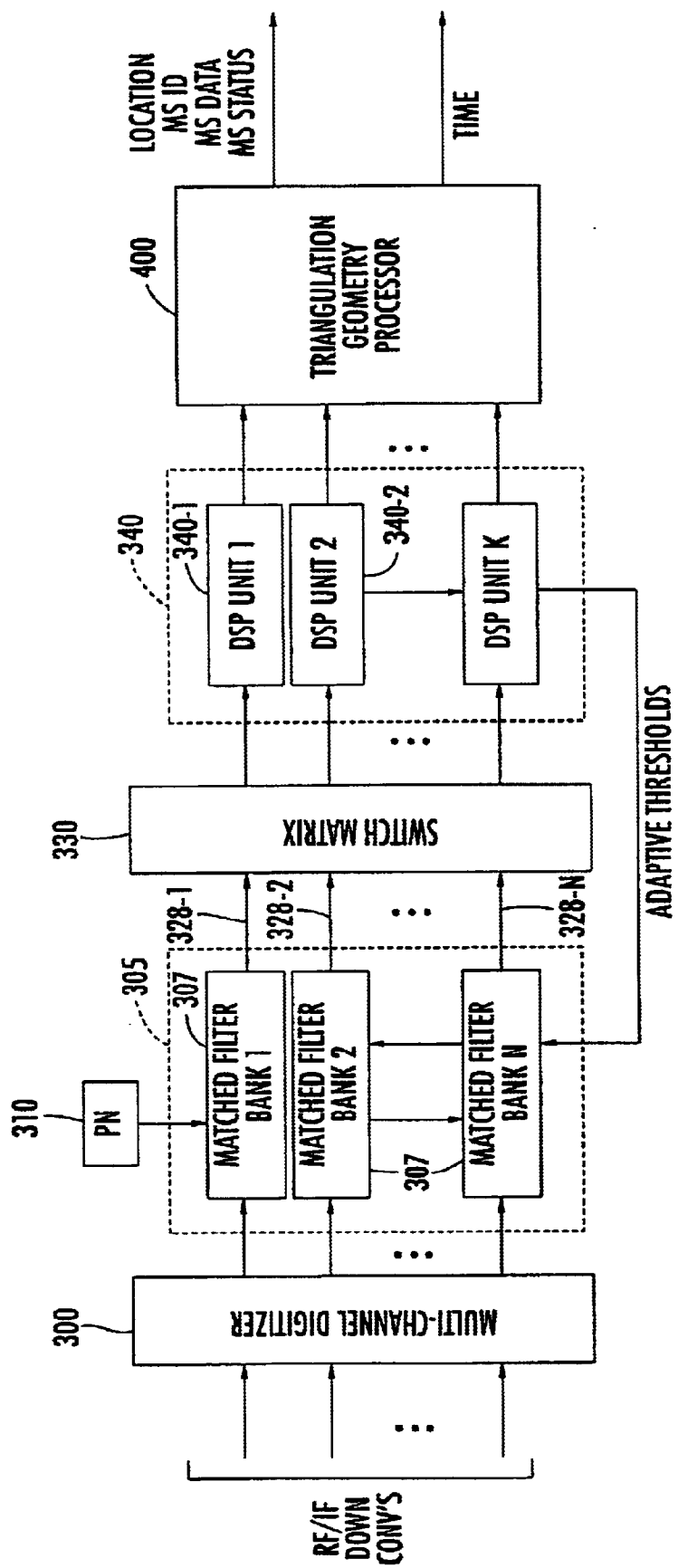

FIGS. 3 and 4 represent examples of the type of circuits that could be used with modifications suggested by those skilled in the art for location processor circuitry to determine which tag signals are first-to-arrive signals and conducting differentiation of first-to-arrive signals to locate a tag. Naturally, with the single coaxial line connection, the problem of the "hub and spoke" can be corrected with the present arrangement using timed, multiplexing techniques known to those skilled in the art. Other details of representative circuits that could be used with various modifications suggested by those skilled in the art are shown in the above-identified and incorporated by reference patents.

Referring now to FIGS. 3 and 4, a representative circuit and algorithm as described in the above mentioned and incorporated by reference patents are disclosed and set forth in the description below to aid in understanding the type of location processor system circuitry can be used for determining which communication signals are first-to-arrive signals and how the processor conducts differentiation of the first-to-arrive signals to locate a TAG.

FIG. 3 diagrammatically illustrates one type of circuitry configuration of a respective architecture for "reading" associated communication signals or a pulse (a "blink") used for location determination signals, such as signals emitted from a TAG. An antenna 210 senses appended transmission bursts or other signals from the mobile access point station to be located. The antenna in this aspect of the invention could also be omnidirectional and circularly polarized and coupled to a power amplifier 212, whose output is filtered by a bandpass filter 214. Naturally, dual diversity antennae could be used as noted in the incorporated by reference patents. Respective I and Q channels of the bandpass filtered signal are processed in associated circuits corresponding to that coupled downstream of filter 214. To simplify the drawing only a single channel is shown.

A respective bandpass filtered I/Q channel is applied to a first input 221 of a down-converting mixer 223. Mixer 223 has a second input 225 coupled to receive the output of a phase-locked local IF oscillator 227. IF oscillator 227 is driven by a highly stable reference frequency signal (e.g., 175 MHz) coupled over a (75 ohm) communication cable 231 from a control processor. The reference frequency applied to phase-locked oscillator 227 is coupled through an LC filter 233 and limited via limiter 235.

The IF output of mixer 223, which may be on the order of 70 MHz, is coupled to a controlled equalizer 236, the output of which is applied through a controlled current amplifier 237 and preferably applied to communication cable 231 through a communication signal processor, which could be an associated processor as described before. The communication cable 231 also supplies DC power for the various components of the location receiver by way of an RF choke 241 to a voltage regulator 242, which supplies the requisite DC voltage for powering an oscillator, power amplifier and analog-to-digital units of the receiver.

The amplitude of the (175 MHZ) reference frequency supplied by the communications control processor to the phase locked local oscillator 227 implies the length of any communication cable 231 (if used) between a location processor and a receiver. This magnitude information can be used as control inputs to equalizer 236 and current amplifier 237, so as to set gain and/or a desired value of equalization, that may be required to accommodate any length of a communication cable (if used). For this purpose, the magnitude of the reference frequency may be detected by a simple diode detector 245 and applied to respective inputs of a set of gain and equalization comparators shown at 247. The outputs of comparators are quantized to set the gain and/or equalization parameters.

FIG. 4 diagrammatically illustrates the architecture of a correlation-based, RF signal processor circuit as part of a processor to which the output of a respective RF/IF conversion circuit of FIG. 3 can be coupled for processing the output and determining location. The correlation-based RF signal processor correlates spread spectrum signals detected by an associated tag signal reader with successively delayed or offset in time (by a fraction of a chip) spread spectrum reference signal patterns, and determines which spread spectrum signal is the first-to-arrive corresponding to a location pulse or communications signal from the transmitter of a mobile access point station as part of the communications signal that has traveled over the closest observable path between a mobile access point station and the fixed location access point station or TAG and spaced monitoring receiver.

Because each reader can be expected to receive multiple signals from the TAG due to multipath effects caused by the signal transmitted by the TAG being reflected off various objects/surfaces, the correlation scheme ensures identification of the first observable transmission, which is the only signal containing valid timing information from which a true determination can be made of the distance.

For this purpose, as shown in FIG. 4, the RF processor employs a front end, multichannel digitizer 300, such as a quadrature IF-baseband down-converter for each of an N number of receivers. The quadrature baseband signals are digitized by associated analog-to-digital converters (ADCs) 272I and 272Q. Digitizing (sampling) the outputs at baseband serves to minimize the sampling rate required for an individual channel, while also allowing a matched filter section 305, to which the respective channels (reader outputs) of the digitizer 300 are coupled to be implemented as a single, dedicated functionality ASIC, that is readily cascadable with other identical components to maximize performance and minimize cost.

This provides an advantage over bandpass filtering schemes, which require either higher sampling rates or more expensive ADCs that are capable of directly sampling very high IF frequencies and large bandwidths. Implementing a bandpass filtering approach typically requires a second ASIC to provide an interface between the ADCs and the correlators. In addition, baseband sampling requires only half the sampling rate per channel of bandpass filtering schemes.

The matched filter section 305 may contain a plurality of matched filter banks 307, each of which is comprised of a set of parallel correlators, such as described in the above identified, incorporated by reference '926 patent. A PN spreading code generator could produce a PN spreading code (identical to that produced by a PN spreading sequence generator of a TAG transmitter). The PN spreading code produced by PN code generator is supplied to a first correlator unit and a series of delay units, outputs of which are coupled to respective ones of the remaining correlators. Each delay unit provides a delay equivalent to one-half a chip. Further details of the parallel correlation are found in the incorporated by reference '926 patent.

As a non-limiting example, the matched filter correlators may be sized and clocked to provide on the order of $4 \times 10^6$ correlations per epoch. By continuously correlating all possible phases of the PN spreading code with an incoming signal, the correlation processing architecture effectively functions as a matched filter, continuously looking for a match between the reference spreading code sequence and the contents of the incoming signal. Each correlation output port 328 is compared with a prescribed threshold that is adaptively established by a set of "on-demand" or "as needed" digital processing units 340-1, 340-2, . . . , 340-K. One of the correlator outputs 328 has a summation value exceeding the threshold in which the delayed version of the PN spreading sequence is effectively aligned (to within half a chip time) with the incoming signal.

This signal is applied to a switching matrix 330, which is operative to couple a "snapshot" of the data on the selected channel to a selected digital signal processing unit 340-1 of the set of digital signal processing units 340. The units can "blink" or transmit location pulses randomly, and can be statistically quantified, and thus, the number of potential simultaneous signals over a processor revisit time could determine the number of such "on-demand" digital signal processors required. A processor would scan the raw data supplied to the matched filter and the initial time tag. The raw data is scanned at fractions of a chip rate using a separate matched filter as a co-processor to produce an auto-correlation in both the forward (in time) and backwards (in time) directions around the initial detection output for both the earliest (first observable path) detection and other buried signals. The output of the digital processor is the first path detection time, threshold information, and the amount of energy in the signal produced at each receiver's input, which is supplied to and processed by the time-of-arrival-based multi-lateration processor section 400.

Processor section 400 could use a standard multi-lateration algorithm that relies upon time-of-arrival inputs from at least three readers to compute the location of the TAG. The algorithm may be one which uses a weighted average of the received signals. In addition to using the first observable signals to determine object location, the processor also can read any data read out of a memory for the TAG and superimposed on the transmission. Object position and parameter data can be downloaded to a data base where object information is maintained. Any data stored in a TAG memory may be augmented by altimetry data supplied from a relatively inexpensive, commercially available altimeter circuit. Further details of such circuit are found in the incorporated by reference '926 patent.

It is also possible to use an enhanced circuit as shown in the incorporated by reference '926 patent to reduce multi-path effects, by using dual antennae and providing spatial diversity-based mitigation of multipath signals. In such systems, the antennas are spaced apart from one another by a distance that is sufficient to minimize destructive multipath interference at both antennas simultaneously, and also ensure that the antennas are close enough to one another so as to not significantly affect the calculation of the location of the object by a downstream multi-lateration processor.

The multi-lateration algorithm executed by the location processor 16 could be modified to include a front end subroutine that selects the earlier-to-arrive outputs of each of the detectors as the value to be employed in a multi-lateration algorithm. A plurality of auxiliary "phased array" signal processing paths can be coupled to the antenna set (e.g., pair), in addition to any paths containing directly connected receivers and their associated first arrival detectors that feed the locator processor. Each respective auxiliary phased array path is configured to sum the energy received from the two antennas in a prescribed phase relationship, with the energy sum being coupled to associated units that feed a processor as a triangulation processor.

The purpose of a phased array modification is to address the situation in a multipath environment where a relatively "early" signal may be canceled by an equal and opposite signal arriving from a different direction. It is also possible to take advantage of an array factor of a plurality of antennas to provide a reasonable probability of effectively ignoring the destructively interfering energy. A phased array provides each site with the ability to differentiate between received signals, by using the "pattern" or spatial distribution of gain to receive one incoming signal and ignore the other.

The multi-lateration algorithm executed by the location processor 16 could include a front end subroutine that selects the earliest-to-arrive output of its input signal processing paths and those from each of the signal processing paths as the value to be employed in the multi-lateration algorithm (for that receiver site). The number of elements and paths, and the gain and the phase shift values (weighting coefficients) may vary depending upon the application.

It is also possible to partition and distribute the processing load by using a distributed data processing architecture as described in the incorporated by reference U.S. Pat. No. 6,127,976. This architecture can be configured to distribute the workload over a plurality of interconnected information handling and processing subsystems. Distributing the processing load enables fault tolerance through dynamic real-location.

The front end processing subsystem can be partitioned into a plurality of detection processors, so that data processing operations are distributed among sets of processors. The partitioned processors are coupled in turn through distributed association processors to multiple location processors. For TAG detection capability, each reader could be equipped with a low cost omnidirectional antenna, that provides hemispherical coverage within the monitored environment.

A detection processor filters received energy to determine the earliest time-of-arrival energy received for a transmission, and thereby minimize multi-path effects on the eventually determined location of a TAG. The detection processor demodulates and time stamps all received energy that is correlated to known spreading codes of the transmission, so as to associate a received location pulse with only one TAG. It then assembles this information into a message packet and transmits the packet as a detection report over a communication framework to one of the partitioned set of association processors, and then de-allocates the detection report.

A detection processor to association control processor flow control mechanism equitably distributes the computational load among the available association processors, while assuring that all receptions of a single location pulse transmission, whether they come from one or multiple detection processors, are directed to the same association processor.

The flow control mechanism uses an information and processing load distribution algorithm, to determine which of the association processors is to receive the message, and queues the message on a prescribed protocol coupling socket connecting the detection processor to the destination association processor. To select a destination association processor, the information and processing load distribution algorithm may include a prime number-based hashing operation to ensure a very uniform distribution of packets among association processors. In addition, to provide relatively even partitioning in the case of widely varying transmission rates, the hashing algorithm may use a sequence number contained in each transmission.

Each association processor can organize its received message packets by identification (ID) and time-of-arrival (TOA), and stores them as association reports. The association processor compresses the data within the association report, transmits that information over an association communication process of the communication framework to one of a plurality of distributed location processors, and then de-allocates the association report.

In order to deliver all association reports that have been generated for a TAG to a single destination location processor, the association communication process of the communication framework may employ the same information and processing load distribution algorithm executed by the detection communication process of the communication framework. Each location processor determines the geographical location of a TAG using the time-of-arrival measurement information originally sourced from the detection processors. The specific algorithm employed for location determination matches the number of arrival time measurements with whatever a priori information is available.

To locate a TAG, a processor may employ all available diversity information associated with the mobile of interest, including, but not limited to the station ID (if any), any data contained in the transmission and metrics indicating confidence it these values. It then forwards a location report containing this information over a location communication process to an asset management data base. A location estimate may be derived from the measured time-of-arrival information in a received association report packet, using a differential time-of-arrival algorithm, such as a hyperbolic geometry-based function.

Many modifications and other embodiments of the invention will come to the mind of one skilled in the art having the benefit of the teachings presented in the foregoing descriptions and the associated drawings. Therefore, it is to be understood that the invention is not to be limited to the specific embodiments disclosed, and that the modifications and embodiments are intended to be included within the scope of the dependent claims.

That which is claimed is:

1. A system for identifying objects within a monitored environment comprising:

a plurality of tag signal readers contained within the monitored environment and serially connected along a single connection line for receiving tag signals from at least one tag contained within the monitored environment, wherein the tag signals received by tag signal readers are timed and associated with a particular tag emission reader; and a location processor connected to the single connection line for determining which tag signals are first-to-arrive signals and conducting differentiation of the first-to-arrive signals to locate a tag.

2. A system according to claim 1, wherein the single, connection line comprises a single, coaxial cable.

3. A system according to claim 1, wherein the tag signals comprise pseudo random spread spectrum radio frequency signals.

4. A system according to claim 1, wherein said location processor comprises a matched filter correlator having a plurality of matched filter banks containing parallel correlators.

5. A system according to claim 1, wherein said tag comprises a mobile device.

6. A system for identifying objects within a multistory building comprising:

a plurality of vertically separated tag signal readers positioned at a corner on each floor of the multistory building and serially connected along a single connection line extending vertically and connecting tag signal readers at a corner for receiving tag signals from at least one tag contained within the multistory building, wherein the tag signals received by tag signal readers are timed and associated with a particular tag signal reader positioned at a corner; and a location processor connected to the single connection line for determining which tag signals are first-to-arrive signals and conducting differentiation of the first-to-arrive signals to locate a tag within the multistory building.

7. A system according to claim 6, wherein said multistory building comprises four corners per floor and a respective tag signal reader is positioned at each corner and vertically connected to any tag signal readers positioned immediately above and below.

8. A system according to claim 6, wherein the single, connection line comprises a single, coaxial cable.

9. A system according to claim 6, wherein the tag signals comprise pseudo random spread spectrum radio frequency signals.

10. A system according to claim 6, wherein said location processor comprises a matched filter correlator having a plurality of matched filter banks containing parallel correlators.

11. A system according to claim 6, wherein said tag comprises a mobile device.

12. A method of identifying objects within a monitored environment comprising the steps of:

generating tag signals from at least one tag within the monitored environment;

receiving tag signals within tag signal readers that are serially connected along a single connection line such that the tag signals received by tag signal readers are timed and associated with a particular tag signal reader; and processing the tag signals within a location processor connected to the single connection line to determine which tag signals are first-to-arrive signals and conducting differentiation of the first-to-arrive signals to locate a tag.

13. A method according to claim 12, wherein the single connection line comprises a single, coaxial cable.

14. A method according to claim 12, and further comprising the step of transmitting the tag signals as pseudo random spread spectrum radio frequency signals.

15. A method according to claim 12, and further comprising the step of processing the pseudo random spread spectrum radio frequency signals by a matched filter correlator having a plurality of matched filter banks containing parallel correlators.

16. A method according to claim 12, wherein a tag comprises a mobile device.

17. A method of identifying objects within a monitored environment of a multistory building comprising the steps of:

generating tag signals from at least one tag within the multistory building;

receiving tag signals within vertically separated tag signal readers that are serially connected along a single connection line such that the tag signals are timed and associated with a particular tag signal reader, wherein a tag signal reader is positioned at each corner of a floor and connected vertically with a tag signal reader positioned at a corner directly above and below the floor; and processing the tag signals within a location processor connected to the single connection line to determine which tag signals are first-to-arrive signals and conducting differentiation of the first-to-arrive signals to locate a tag.

18. A method according to claim 17, wherein the single connection line comprises a single, coaxial cable.

19. A method according to claim 17, and further comprising the step of transmitting the tag signals as pseudo random spread spectrum radio frequency signals.

20. A method according to claim 17, and further comprising the step of processing the pseudo random spread spectrum radio frequency signals by a matched filter correlator having a plurality of matched filter banks containing parallel correlators.

21. A method according to claim 17, wherein a tag comprises a mobile device.

22. A method according to claim 17, wherein said multistory building comprises four corners per floor and a respective tag signal reader positioned at each corner and vertically connected to only tag signal readers positioned immediately above and below.

* * * * *